Oct. 27, 1964    C. C. ANTHES    3,154,089
DOUBLE PREHEAT FLAME CONTROLLER
Filed Jan. 9, 1961    3 Sheets-Sheet 1

INVENTOR.
CLIFFORD C. ANTHES
BY William F. Mesinger
ATTORNEY

Oct. 27, 1964     C. C. ANTHES     3,154,089
DOUBLE PREHEAT FLAME CONTROLLER
Filed Jan. 9, 1961     3 Sheets-Sheet 3

INVENTOR.
CLIFFORD C. ANTHES
BY William H. Mesinger
ATTORNEY

United States Patent Office 3,154,089
Patented Oct. 27, 1964

3,154,089
DOUBLE PREHEAT FLAME CONTROLLER
Clifford C. Anthes, Union, N.J., assignor to Union Carbide Corporation, a corporation of New York
Filed Jan. 9, 1961, Ser. No. 81,557
5 Claims. (Cl. 137—98)

This invention relates to an improved preheat flame control device for use with oxygen cutting torches. More particularly, it concerns an improved control for automatically reducing the flow of preheat gases and, thus, the intensity of the preheat flame when the cutting oxygen flow is started.

In cutting metal with a stream of oxidizing gas, oxygen and a fuel gas—such as acetylene, natural gas, propane, etc.—are normally supplied to the cutting torch to provide a preheat flame. The preheat flame heats the metal to its kindling or ignition temperature, after which the cut is started by directing a stream of cutting oxygen at the preheated spot. In order to keep the preheat time required to bring the metal to its kindling temperature to a minimum for rapid starts, it is desirable to use high velocity, high oxygen-to-fuel gas ratio preheat flames supplied with relatively large volumes of preheat gases. However, once the cut has been started, particularly in mechanized cutting, it is necessary to reduce the size of the preheat flames and also to reduce the ratio of preheat oxygen to fuel gas in order to produce cuts of top quality with sharp kerf top edges, parallel cut faces, and no slag adherence on the bottom of the kerf.

The degree of preheat volume cutback is governed by several factors. One factor is the condition of the plate surface. If the plate surface is coated with heavy rust and scale, the quantity of preheat required may very well approach the full preheat flow used for starting. Another factor is the type of steel being cut. Some steels, especially the high alloy steels, require considerable preheat volume even during the cutting cycle. A third factor also is the type of cutting being done. Cutting bevels for the plate preparation for welding is one type requiring considerable preheat during the cutting cycle in order to maintain a reasonable cutting speed. Preheat cutback for the cutting cycle when cutting relatively clean mild carbon steel with the average light coating of mill scale will be as much as 75 percent for relatively light plate (⅜ in. to 2 in.), tapering off to 10 to 25 percent cutback for the heavier plate (3 in. to 10 in.). In all cases the preheat cutback should be just sufficient to eliminate kerf top edge roll—or melt-over. Any preheat reduction beyond this point will reduce the cutting speed.

It is also desirable to reduce the ratio of preheat oxygen to fuel gas once the cut is started to provide the softer flames required to ensure maximum cutting speed coupled with top quality cuts with no slag adherence. For example, in the case of natural gas, the ratio should be reduced from the 2 to 1, used during the preheat cycle, to approximately 1.5 to 1 for the cutting cycle. Propane requires a similar reduction in ratio from 5 to 1 to approximately 3.5 to 1. Very heavy cutting (10 in. and up) will benefit from use of still softer flames— that is, flames obtained with a ratio as low as 1 to 1 for natural gas and 2.5 to 1 for propane.

Thus, good quality, high speed, economical oxygen cutting of metals requires the use of high ratio, large volume preheat flames to start the cutting reaction and then, when the cut is started, a reduction or cutback in both the volume of the preheat flames and the oxygen-to-fuel gas ratio of these preheat flames during the cutting cycle.

This preheat flame cutback could be accomplished, of course, by manually readjusting the preheat throttle valves on the cutting torch after the cut has been started. However, this is highly undesirable solution for a number of reasons. Obviously, in a mechanized cutting operation involving the use of a number of cutting torches, a considerable length of cut would have been completed before the preheat flames on the last torch had been readjusted. This would also necessitate the laborious task of resetting the preheat valves on each of the torches for the larger volume, high ratio preheat required for starting the next cutting operation. Even the inclusion of a manually operated lever or switch on each of the torches to effect the preheat cutback entails a delay until the last torch is adjusted. Less obvious but just as important in terms of cut quality, is the inconvenience as well as skill involved in properly readjusting the preheat flames, after cut initiation, particularly in machine cutting.

The ideal solution for the preheat flame cutback problem would thus involve a means for accomplishing the cutback automatically in response to the opening of the cutting oxygen valve. Various devices have been designed to accomplish this. For example, the preheat flame control disclosed in pending application, Serial No. 761,805, now Patent No. 3,010,468, accomplishes the desired results to a limited degree by automatically reducing the preheat oxygen flow, on which the fuel gas flow is dependent, when the cutting oxygen valve is opened. This device is limited to use with injector-type cutting torches since no provision is made to individually reduce the fuel gas flow. This device also makes no provision for controllably altering the oxygen-to-fuel gas ratio from the relatively high ratio, best suited to rapid preheat, to the lower ratio, softer flame for the actual cutting cycle.

Another preheat control device accomplishes the automatic cutback in flow of both the preheat oxygen and fuel gas in response to the initiation of cutting oxygen flow. Removable disks, having carefully measured orifices, are used to restrict the volume of the preheat gases passing to the cutting torch during the cutting cycle. Proper sizing of these removable orifice disks would permit achieving the desired reduced ratio of oxygen to fuel gas as well as volume. However, any change in plate thickness, plate surface condition, type of material, or other operating conditions would necessitate the changing of these orifice disks to suit the new conditions. Also, the design of the device is not only complicated and expensive to manufacture, but bulky and cumbersome.

Accordingly, it is an object of this invention to provide an improved device for the automatic cutback of both volume and ratio of the preheat gases in response to the initiation of the cutting oxygen flow.

Another object is to provide a simple, easily adjustable device which can be adjusted to any desired cutting cycle preheat flow or oxygen-to-fuel gas ratio condition.

Still another object is to provide a control device suitable for use with either an injector or mixer-type cutting torch.

Further objects and advantages will be pointed out or become apparent from the following description and drawings in which.

Figure 1:
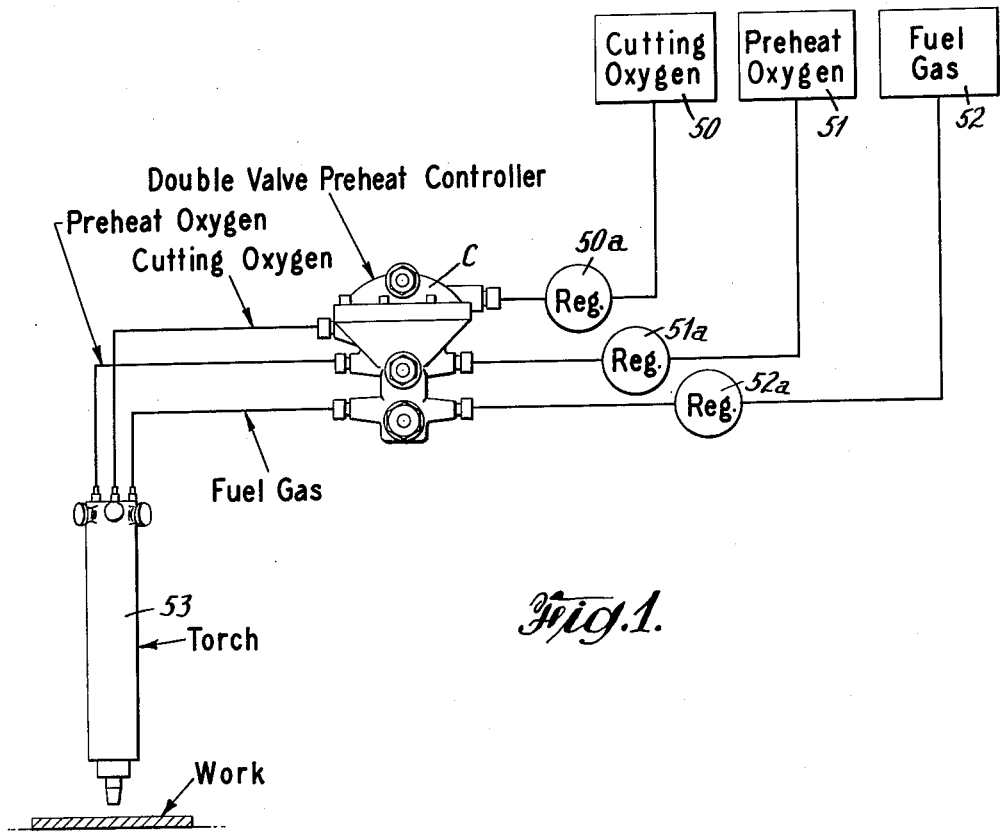
FIG. 1 is a schematic diagram of the invention control connected for operation.

In FIG. 1 is shown a diagrammatic flow sheet of an oxygen cutting blowpipe installation embodying the features of the invention and comprises a controller C which admits cutting oxygen from a source of high pressure oxygen 50; preheat oxygen from a source of high pressure preheat oxygen; and fuel gas from a source of gas 52 and controls the flow of such gases to a cutting torch 53. Regulators 50a, 51a, 52a, control the pressure of the cutting oxygen, preheat oxygen, and fuel gas respectively.

Figure 4:
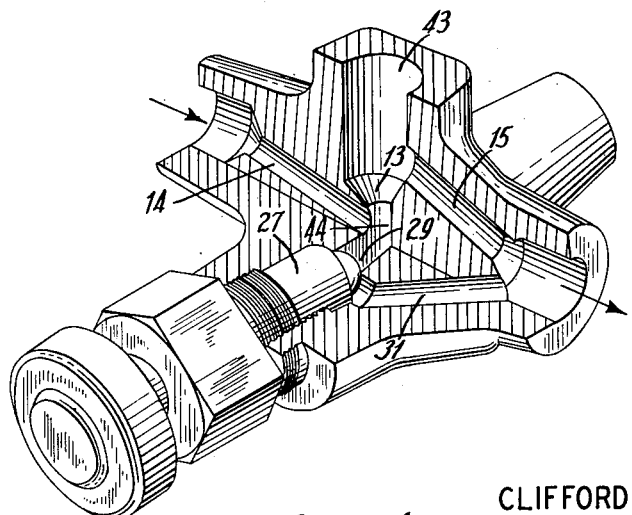
FIG. 4 is a partially sectioned prospective view of the lower half of the controller.
Figure 2:
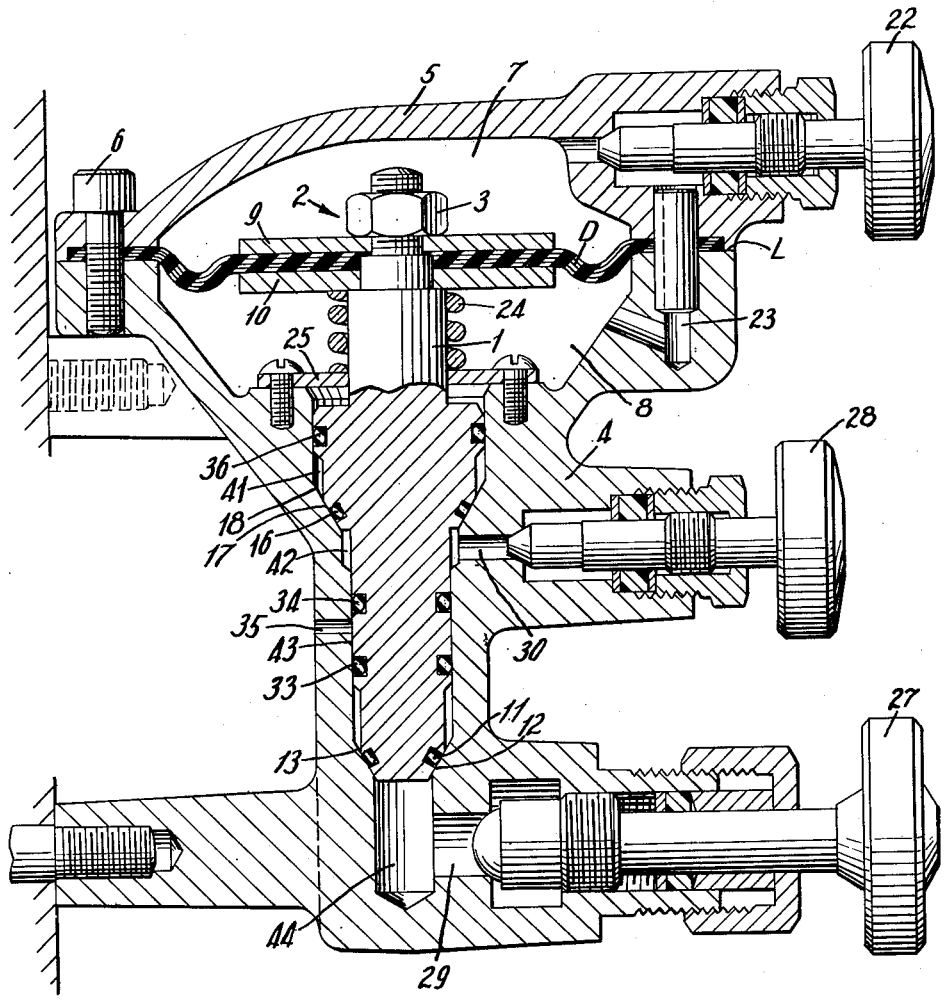
FIG. 2 is a partially sectioned side view of the controller embodying the present invention.
Figure 3:
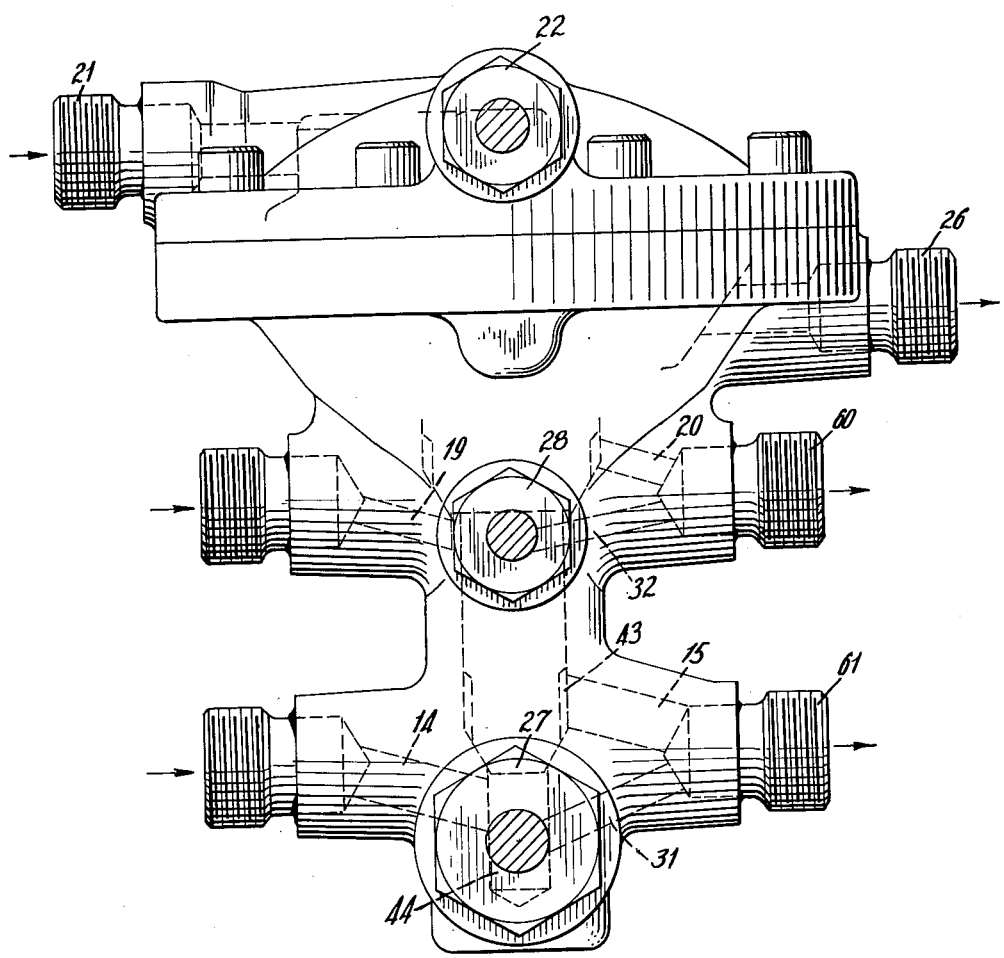
FIG. 3 is a front elevation view of the controller of the present invention.

The double preheat flame control device of the invention is shown in FIGS. 2, 3, and 4. Basically, the device comprises a diaphragm-operated double valve unit, which is interposed in the gas lines between the cutting oxygen, preheat oxygen and fuel gas supplies and the torch (or torches, in the case of a multi-torch mechanized setup). FIG. 1 illustrates the arrangement for a single torch installation. The double valve, which controls the preheat oxygen and fuel gas flows, is a normally open valve permitting unrestricted flow of the two gases during the preheat cycle of the cutting operation. However, when the torch cutting valve is opened, a differential pressure across the control diaphragm causes the double valve to close, permitting the passage of the preheat gases only through the by-pass or restricted passages in the control device. Thus, the preheat flows are automatically reduced to the desired low volume, reduced ratio cutting cycle flows.

Referring to FIG. 2 the main body portion of the controller comprises a casing or valve body 4 shaped to provide supporting ledges L for the flexible diaphragm assembly 2.

Moveable valve stem 1 is attached to the diaphragm assembly 2 by means of nut 3 so as to move up or down with the diaphragm assembly. Diaphram assembly 2, consisting of a flexible diaphragm D with metal diaphragm plates 9 and 10 on either side, is sealingly clamped between the valve body or casing 4 and cap 5 by means of a plurality of screws 6 located around the periphery of the cap 5. Thus, two pressure chambers 7 and 8 are formed on either side of the diaphragm.

Casing 4 has three centrally located concentric bores arranged in tandem, a large diameter bore 41 with a conical portion 18 and terminating with a cutout section 42; then an intermediate diameter bore 43 terminating with a conical portion 13; and then a straight walled small diameter bore 44. Casing 4 also has a preheat oxygen inlet passage 19 and a fuel gas inlet passage 14 communicating with the cutout section 42 of said large diameter bore 41 and said small diameter bore 44 respectively. A main preheat oxygen outlet passage 20 communicates with the large diameter bore 41 at a point above the conical portion 18 and a by-pass preheat oxygen passage 30 communicates with the cutout section 42 of said large diameter bore 41 at a point below the conical portion 18. In other words the main preheat oxygen outlet passage 20 is downstream relative to the by-pass preheat oxygen passage 30. Interposed in said by-pass preheat oxygen passage 30 is a throttle valve 28. By-pass preheat oxygen outlet passage 32 provides a passage from the valve 28 to preheat oxygen outlet connection 60 which also communicates with main preheat oxygen outlet passage 20. A main fuel gas outlet passage 15 communicates with said intermediate diameter bore 43 and a by-pass fuel gas passage 29 communicates with said small diameter bore 44. In other words, the main fuel gas outlet passage 15 is downstream relative to said by-pass passage 29. Interposed in said by-pass fuel gas passage is a throttle valve 27. By-pass fuel gas outlet passage 31 provides a passage from valve 27 to outlet fuel gas connection 61 which also communicates with main fuel gas outlet passage 15.

When the device of the invention is assembled in the gas lines between the gas supplies and the torch, the cutting oxygen enters pressure chamber 7 above the diaphragm assembly 2 through inlet connection 21. From chamber 7, the cutting oxygen flows through control valve 22, and passage 23 into pressure chamber 8, located under the diaphragm assembly 2. The cutting oxygen passes from chamber 8 to a hose leading to the torch through outlet connection 26. Thus, during the preheat cycle, when no cutting oxygen is flowing, the gas pressures P1 and P2 in chambers 7 and 8, respectively, are the same. That is, the pressure on both sides of diaphragm assembly 2 are identical ($P1=P2$). Under these conditions, valve opening spring 24, acting between stationary spring back-up plate 25 and diaphragm assembly 2, is free to exert an upward or valve opening force on the underside of the diaphragm assembly 2 and, hence, the attached valve stem 1. In this raised or open position, O ring 11, located on the lower smaller conical portion 12 of valve stem 1 is lifted out of sealing engagement with mating conical portion 13 of the intermediate diameter bore 43 in the valve body 4. Thus, fuel gas is permitted unrestricted flow from inlet passage 14 to its main outlet passage 15. Similarly, O ring 16, located on the upper larger conical portion 17 of valve stem 1 is lifted out of sealing engagement with mating conical portion 18 in the larger diameter bore 41 in body 4 to permit unrestricted flow of preheat oxygen from inlet passage 19 to its man outlet passage 20. Thus, full volume preheat flow is established through the device to the cutting torch.

When the preheat cycle has been completed and the cutting oxygen valve on the cutting torch (or the main cutting oxygen control valve in a mechanized multiple-torch setup) is opened to initiate the cutting cycle, a pressure differential (or pressure drop) is created across diaphragm assembly 2 due to the presence of control valve 22 in the cutting oxygen passage 23 between pressure chamber 7 and 8. Control valve 22, in conjunction with the cutting oxygen supply pressure P1, is adjusted such that the resulting pressure differential between P1 and P2 is sufficient to overcome the force of valve opening spring 24 and cause the diaphragm assembly 2 and attached valve stem 1 to move downward into the valve closed position. In this position (as illustrated in FIG. 2) O ring 11 sealingly engages conical portion 13 in the intermediate diameter bore 43 in valve body 4, thus preventing fuel gas from flowing from passage 14 to passage 15. Similarly, O ring 16 sealingly engages the conical portion 18 in the large diameter bore 41 in valve body 4 to prevent the preheat oxygen from flowing from passage 19 to passage 20.

The reduced flow of the preheat gases during the cutting cycle is accomplished by means of control or throttle valves 27 and 28, respectively, located in by-pass passages 29 (fuel gas) and 30 (preheat oxygen) of the control device. That is, with the main preheat oxygen and fuel gas passages closed in the manner outlined above, the fuel gas from inlet passage 14 flows through the small diameter bore 44 in body 4 and then through by-pass passage 29, through valve 27, to by-pass outlet passage 31. Similarly, preheat oxygen from inlet 19 flows through the cutout section 42 of intermediate diameter bore 43 in body 4 and then through by-pass passage 30, through valve 28, to by-pass outlet passage 32. Throttle valves 27 and 28 are preset to deliver the desired low volume, low ratio cutting cycle preheat flows. The use of readily adjustable throttle valves instead of metering orifices to determine the desired low volume, low ratio cutting cycle preheat flows makes the device easily adjustable to different operating conditions, material thicknesses, etc. No disassembly and replacement with different size orifices are required. It is merely necessary to readjust the throttle valve settings for different operating condition.

The double O ring seas at 33 and 34 with the port 35, which is open to the atmosphere at one end and to the space between the O rings at the other, prevents any possibility of leakage of the fuel gas into the preheat oxygen and vice-versa. Similarly, O ring 36 provides a seal between the pressure chamber 8 and the preheat oxygen.

Thus, it may be seen that in operation, when using either a single torch or multiple torches, the throttle valves on the torch or torches are preset to deliver the desired large volume, high ratio preheat flows required for the preheat cycle of the cutting operation, and the preheat control device permits unrestricted flow of the preheat gases through the main preheat passages of the control device to the torch or torches. In actuality, the large volume preheat flows being fed to the torch or torches during the preheat cycle are a combination or total of the gases passing through both the main preheat passages of the control device and the by-pass passages. Both the main and by-pass passages of the device are open when the double valve is in the open position. At the conclusion of the preheat cycle, the cutting oxygen valve (valve located on the torch itself for single torch operation or a main cutting oxygen valve located downstream of the preheat control device in the case of a mechanized multiple-torch operation) is opened initiating flow of cutting oxygen through the preheat control device. This, in turn, automatically actuates the diaphragm controlled double valve of the preheat control device to close off the main preheat passages. The flow of preheat gases to the cutting torch or torches are then restricted to that permitted by the preset control or throttle valves in the by-pass passages of the preheat control device.

Another method of operating the device of the invention is as follows:

In mechanized multiple torch operation, instead of having the cutting oxygen pass through the preheat control device and having the pressure differential between P1 and P2 operate to close the double valve unit, the cutting oxygen, controlled by a main valve located upstream of the preheat control device, may be permitted to flow directly to the cutting torches without passing through the control device. In this case, the cutting oxygen inlet 21 of the preheat control device is connected to a T connection in the cutting oxygen line downstream of the main cutting oxygen control valve. Outlet connection 26 is left open to the atmosphere, and control valve 22 is maintained in a closed position. With this arrangement, during the preheat cycle, with the main cutting oxygen valve closed, atmospheric pressure is present on both sides of diaphragm assembly 2, and valve opening spring 24 causes the double valve of the control device to open permitting unrestricted flow of both the preheat gases. When the main cutting oxygen valve is opened to initiate the cutting cycle, the cutting oxygen pressure, which enters pressure chamber 7 via the connection between the T connection and the inlet 21, pressurizes the diaphragm assembly 2, overcoming the force of the valve opening spring 24 and causing the valve to move into its closed position closing the main preheat gas passages of the control device. The flow of preheat gases is then restricted to that permitted by the preset control valves in the by-pass passages of the control device.

While the invention has been described by referring to a preferred embodiment, it is to be understood that certain modifications may be made without departing from the spirit and scope thereof. For example a bellows could be clamped in the controller body similarly to the manner in which the diaphragm is clamped and the valve stem could be attached to the underside of the top closed end of the bellows. In this way, the valve stem would be moved in response to movements of the bellows. The length of the valve stem would be such that, with no pressure differential across the bellows, the valve stem would be in the open position. When a pressure differential is created across the bellows, the compression of the bellows would cause the valve stem to move down into the closed position.

What is claimed is:

1. A valve mechanism comprising a casing; a pressure responsive element clamped in said casing and forming top and bottom chambers on the top and bottom sides respectively of said pressure responsive element in said casing; said casing having an inlet to said top chamber and an outlet from said bottom chamber; a spring cooperating with said casing and said element opposing the inlet pressure against said element; a valve stem secured to said pressure responsive element; said stem having a small conical portion and a conical portion larger than said small conical portion; said casing having arranged in tandem a large diameter bore with a conical portion adapted to register with said larger conical portion of said stem; an intermediate diameter bore with a conical portion adapted to register with said small conical portion on said stem, and a third small diameter bore; a preheat oxygen inlet passage in said casing communicating with said large diameter bore; a fuel gas inlet passage in said casing communicating with said small diameter bore; a main preheat oxygen outlet passage in said casing communicating with said large diameter bore at a point before said conical portion thereof; a main fuel gas outlet passage in said casing communicating with said intermediate diameter bore; a by-pass preheat oxygen passage in said casing communicating with said large diameter bore at a point immediately after said conical portion thereof; a by-pass fuel gas passage in said casing communicating with said small diameter bore; and metering means located in each of said by-pass passages for controlling the flow of preheat oxygen and fuel through such passages.

2. Apparatus according to claim 1 wherein said pressure responsive element is a diaphragm.

3. A pressure responsive valve mechanism comprising a casing; a cap for said casing; a pressure responsive diaphragm clamped between said cap and said casing and forming top and bottom chambers on the top and bottom sides respectively of said pressure responsive diaphragm; an inlet in said cap to said top chamber and an outlet in said casing from said bottom chamber; a spring cooperating with said casing and said diaphragm opposing the inlet pressure against said diaphragm; a valve stem secured to said diaphragm and movable therewith and having a small conical portion and a conical portion larger than said small conical portion; said casing being provided with a large diameter bore having a conical section adapted to register with said larger conical portion on said stem; an intermediate diameter bore in tandem with said large diameter bore and terminating in a conical portion adapted to register with said small conical portion on said stem, and a third small diameter straight-walled bore in tandem with said intermediate diameter bore; a preheat oxygen inlet passage in said casing communicating with said large diameter bore; a fuel gas inlet passage in said casing communicating with said small diameter bore; a main preheat oxygen outlet passage in said casing communicating with said large diameter bore at a point before said large conical section of said bore; a by-pass preheat oxygen passage in said casing communicating with said large diameter bore at a point immediately after said conical section of said bore; gas sealing means located on said large conical section of said stem for preventing the flow of gas from said preheat oxygen inlet passage to said main preheat oxygen outlet passage when the valve is in a closed position; a main fuel gas outlet passage in said casing communicating with said intermediate diameter bore; a by-pass fuel gas passage in said casing communicating with said small diameter bore; gas sealing means on said small conical section of said stem for preventing the flow of fuel gas from said fuel gas inlet to said main fuel gas outlet passage when said valve is in the closed position; and a throttle valve located in each of said by-pass passages for controlling the flow of preheat oxygen and fuel through such passages.

4. Apparatus according to claim 3 wherein the gas sealing means are O rings.

5. A pressure responsive valve mechanism as claimed in claim 3 and including cutting oxygen passage means located in said cap and said casing for providing a gas path from said top to said bottom chamber and a throttle valve located in said cutting oxygen passage means for adjusting the pressure differential across said pressure responsive diaphragm.

References Cited in the file of this patent

UNITED STATES PATENTS

| | | |
|---|---|---|
| 1,473,303 | Lightford | Nov. 6, 1923 |
| 2,097,397 | Heinrich | Oct. 26, 1937 |